United States Patent
Ueda

(10) Patent No.: US 7,724,872 B2
(45) Date of Patent: May 25, 2010

(54) INSPECTION METHOD FOR THIN FILM STACK

(75) Inventor: Kazuhiro Ueda, Kawagoe (JP)

(73) Assignee: Hitachi, Ltd., Tokyo (JP)

( * ) Notice: Subject to any disclaimer, the term of this patent is extended or adjusted under 35 U.S.C. 154(b) by 174 days.

(21) Appl. No.: 12/071,021

(22) Filed: Feb. 14, 2008

(65) Prior Publication Data
US 2008/0219409 A1    Sep. 11, 2008

(30) Foreign Application Priority Data
Mar. 9, 2007    (JP) .............................. 2007-060376

(51) Int. Cl.
*G01N 23/201* (2006.01)
(52) U.S. Cl. ....................................................... 378/89
(58) Field of Classification Search .................... 378/89
See application file for complete search history.

(56) References Cited

U.S. PATENT DOCUMENTS

| | | | | |
|---|---|---|---|---|
| 5,619,548 | A * | 4/1997 | Koppel | 378/70 |
| 5,740,226 | A * | 4/1998 | Komiya et al. | 378/70 |
| 6,754,305 | B1 * | 6/2004 | Rosencwaig et al. | 378/89 |
| 6,895,075 | B2 * | 5/2005 | Yokhin et al. | 378/90 |
| 7,110,491 | B2 * | 9/2006 | Mazor et al. | 378/71 |
| 7,130,376 | B2 * | 10/2006 | Berman et al. | 378/82 |

OTHER PUBLICATIONS

Parratt, L.G., "Surface Studies of Solids by Total Reflection of X-Rays", Physical Review, vol. 95, No. 2, Jul. 15, 1954, pp. 359-369.
Sinha, S.K., et al., "X-Ray and Neutron Scattering from Rough Surfaces", Physical Review B, vol. 38, No. 4, Aug. 1, 1988, pp. 2297-2311.
Sakurai, K,. et al., "Fourier Analysis of Interference Structure in X-Ray Specular Reflection from Thin Films", Jpn. J. Appl. Phys., vol. 31, Part 2, No. 2A, Feb. 1, 1992, pp. L113-L115.

* cited by examiner

*Primary Examiner*—Edward J Glick
*Assistant Examiner*—Thomas R Artman
(74) *Attorney, Agent, or Firm*—Stites & Harbison PLLC; Juan Carlos A. Marquez, Esq.

(57) ABSTRACT

An X-ray reflectivity measuring method is provided to measure and inspect, with higher accuracy, film thickness of a thin film stack as a sample where a thick film is provided on the thin film stack. This X-ray reflectivity measuring method can measure X-ray reflectivity of the thin film stack embedded within a thick film by applying the X-ray focused to ⅓ or less the thickness of a thick film on the thin film stack to an end surface of the thick film, transmitting the X-ray through the thick film, thereafter applying the X-ray to the thin film stack, transmitting again the reflected X-ray to the thick film, and then extracting the reflection X-ray from the end surface in the opposite side of the incident surface and also can inspect film thickness of the thin film stack embedded in the thick film with the Fourier transformation method and the minimum square analysis method with the theoretical curve.

8 Claims, 6 Drawing Sheets

INSPECTION METHOD FOR THIN FILM STACK

CLAIM OF PRIORITY

The present application claims priority from Japanese application JP No. 2007-060376 filed on Mar. 9, 2007, the content of which is hereby incorporated by reference into this application.

FIELD OF THE INVENTION

The present invention relates to an inspection method for a thin film stack for non-destructively measuring and inspecting thickness of each layer of the stack by measuring X-ray reflectivity from a sample and analysis of a profile of reflectivity obtained in a thin film stack formed by coating a single layer or more on a substrate and a sample where solution exists on the stack.

BACKGROUND OF THE INVENTION

In the field of semiconductor device and magnetic device, an ultra-thin film is formed to realize more sophisticated functions and higher performances of thin-layered stack materials with layer thickness is increasing. Moreover, in the modern technology devices, interfaces structure of stacked films are also controlled in order to control electron scattering at the interfaces.

In the related art, the ellipsometry method or fluorescence X-ray method are used as a method for evaluating thickness of films to be stacked. The ellipsometry method is used to detect thickness and refractive index of a thin film as a sample by inputting a polarized light to a thin film sample having a flat front surface and by measuring changes in polarized state of the reflected light. However, this method has a problem that measurement is possible only for a sample that is transparent for the light because the light is used. The fluorescence X-ray method is used to estimate thickness of a film by measuring intensity of a fluorescent X-ray generated from a sample. In the case of this method, however, only a total quantity of element having generated the fluorescent X-ray can be detected. Namely, this method has problems that this method cannot measure in direct thickness of film and thickness of film cannot be analyzed separately when plural thin films including the identical element are stacked. In addition, both ellipsometry method and fluorescence X-ray method cannot obtain the information of an interface of the stacked films.

Observation of cross-sectional TEM of a device enables measurement of thickness of films to be stacked with very higher space resolution. Moreover, it is also possible to estimate interface width. However, a sample must be divided into many thin fractional pieces in size of 10 nm or less for TEM observation, meaning a destructive analysis. Accordingly, this method can be used for analysis of a fault but cannot be applied to an inspection apparatus.

As a method for non-destructively measuring thickness and interface of films to be stacked, an X-ray reflectivity method has been proposed. This X-ray reflectivity method may be classified into a couple of kinds. In one method, an X-ray of single color is inputted to a sample nearly in contact with the front surface thereof and reflectivity is measured while an incident angle is varied. In the other method, a white x-ray is inputted to a sample and dependence on wavelength of reflectivity is measured. In these methods, film thickness is analyzed on the basis of interference of X-rays reflected from the front surface of sample and interfaces thereof. In addition, since an interface width gives influence on reflection at the front surface and interface, width of each interface of films to be stacked can also be obtained by analyzing in detail an X-ray reflectivity profile. For a theoretical curve that can be used for analysis of reflectivity, a numerical equation obtained by introducing the effect of unevenness of interface into a recurrence formula of Parratt [Phys. Rev. 95, pp359 (1954)] (Non-patent document 1) proposed by Sinha, et al. [Phys. Rev. B, 38, pp2297 (1988)] (Non-patent document 2) is used. Moreover, the method proposed by Sakurai, et al. [Jpn. J. Appl. Phys. 31, L113 (1992)] (Non-patent document 3) is often used.

SUMMARY OF THE INVENTION

The X-ray reflectivity method is the superior method for evaluating thickness and interface width of each film of a stack, but the X-ray having high intensity and very high parallelism is necessary for analysis of thickness of film and interface width of a sample including very thick films. The measurable maximum film thickness is about 1 μm in a spectroscope utilizing ++ arrangement of symmetrical diffraction of Si (440).

In the case of the sample where films in the thickness of 1 μm are stacked on a thin film stack, almost all vibrations included in a reflectivity profile are short-period vibrations in regard to the film thickness of 1 μm. Moreover, since long-period vibration structure from each layer of the thin film stack is measured as amplitude modulation of the short-period vibration structure, separation from an interface width and an aperture angle of incident X-ray is difficult, making difficult the analysis thereof.

Particularly, in industrial products, a thick protection film is frequently formed on a thin film stack as a device. In the case of this sample, when a thick protection film is formed, unevenness at the front surface generally becomes large. If unevenness at the front surface is large, attenuation of X-ray reflectivity for scattering vector ($q=(4\pi/\lambda)\sin\theta$) occurs to a large extent. Therefore, it becomes impossible to measure reflectively of the area up to the region where the scattering vector is large. For determination of film thickness of the thin film stack, measurement of X-ray reflectivity should be conducted to the area up to the region where the scattering vector is large. Accordingly, in the sample including a thick protection film as explained above, analysis of film thickness of the stack becomes further difficult.

Moreover, in the case of a sample where solution exists on the thin film stack, it is very difficult to set thickness of solution to 1 μm or less from a problem of surface tension or the like and a problem similar to that of the sample where a thick protection film is provided on the thin film stack is also generated. In addition, in the X-ray reflectivity method, an angle (incident angle) between the front surface of sample and the incident X-ray must be controlled with the accuracy of 1/1000°, but measurement of X-ray reflectivity from the sample where solution exists on the stacked films is very difficult due to problems, for example, that surface of solution is bent due to the influence of surface tension, or the like.

Therefore, an object of the present invention is to provide an X-ray reflectivity method for measuring and inspecting film thickness of a stack for the sample including a thick film on the stack or the sample including solution on the stack.

In order achieve the object of the present invention explained above, a side of the sample formed by laminating a protection film in the thickness in the range from several μm to several tens of μm on the thin film stack is processed to 2 mm or less. Next, the X-ray focused to ⅓ or less of the film thickness of the protection film explained above is incident from a side surface of the protection film and it is transmitted through the short side processed to 2 mm or less. In this case, the surface of thin film stacked within the protection film is irradiated with the X-ray and the incident angle of X-ray to the sample is varied. Thereby, the reflectivity of X-ray of the thin film stack within the protection film can be measured.

Film thickness of each layer of a stack can be analyzed by the least square method of an X-ray reflectivity curve obtained with a theoretical reflectivity curve. The theoretical reflectivity curve can be calculated with the following recurrence formulae introducing the effect of unevenness of interface proposed by Sinha, et al. [Phys. Rev. B, 38, pp2297 (1988)] into the recurrence formula proposed by Parratt [Phys. Rev. 95, pp359 (1954)] by defining an incident angle to a stack as $\theta$, wavelength of incident X-ray as $\lambda$, film thickness of the (j)th layer of the stack as $d_j$, width of interface on the (j)th layer as $\sigma_j$, and refractive index as $n = \delta_j - i\beta_j$.

$$Rj-1, n = aj-1\char`\^4 \cdot [(Rj,j+1+Fj-1,j)/(Rj,j+1 \cdot Fj-1,j+1)] \quad (1)$$

$$aj = \exp[-i \cdot \pi \cdot fj \cdot dj/\lambda] \quad (2)$$

$$Fj-1,j = \{(fj-1-fj)/(fj-1+fj)\}\exp[-(fj-1 \cdot fj \cdot \sigma j\char`\^2)/2] \quad (3)$$

$$fj\char`\^2 = (\theta\char`\^2 - 2\delta j - 2i\beta j) \quad (4)$$

Moreover, film thickness of a stack can also be analyzed using the Fourier transformation as explained in the non-patent document 3 by Sakurai, et al. [Jpn. J. Appl. Phys. 31, L113 (1992)]. In this method, the incident angle is converted into scattering vector $(=4\pi \cdot \{(n_j)^2 - (\cos \theta)^2\}^{0.5}/\lambda$ compensated in refractive index, vibration structure of reflectivity is converted by Fourier transformation, and the film thickness dj of the (j)th stack is analyzed from the frequency $\omega_j$ obtained under the condition $d_j = \omega_j/4\pi$.

In the X-ray reflectivity method, an incident angle $\theta$ of X-ray for the stack is about 0.1° to 1° and an incident angle for the end surface of protection film is 89.9° to 89°. Therefore, this incident angle is almost free from the influence of input of light to the protection film, refraction of light at the time of emission thereof, and reflection of light. In the non-patent documents 1 and 3 by Parratt and Sakurai, the first layer is assumed as air (vacuum) where n=1. However, in the conditions in the present invention, the first layer is approximated as a protection film. Therefore, X-ray reflectivity from the stack in the protection film can be analyzed by considering a refractive index of the protection film and thereby an inspection method for thin film stack with less influence of film thickness such as the protection film or the like can be realized.

In addition, in the case where solution exists on the stack in place of the protection film, reflectivity from the stack within the solution layer can also be measured by applying the X-ray condensed to ⅓ or less of the thickness of the solution layer from a side surface of the protection film and then transmitting the X-ray through the short side processed to 2 mm or less. In regard to analysis, an inspection method for a thin film stack for analyzing film thickness of each layer of the stack can be realized by using the theoretical calculation equations and Fourier transformation method.

Thickness of sample in the transmitting direction must be 2 mm or less, because the X-ray is absorbed when it is transmitted through a thick protection film. Since reflection of X-ray at the surface of sample is about 80%, loss in the intensity of X-ray can be lowered to about 20% even when reflection and absorption by the sample are considered. Accordingly, reflectivity can be measured in the order of five to six digits. When the protection film is formed of $SiO_2$, it is enough when the X-ray energy is selected to about 8 keV and thickness is set to 2 mm or less. Moreover, when the X-ray is applied almost in contact with the surface of sample, the X-ray is spread up to about 100 times at the surface of sample. Therefore, the lower limit in the transmitting direction of sample can be set within the range not exceeding the sample.

Regarding focused beam size and thickness of protection film, the X-ray is incident to the sample almost in contact with the sample surface in the angular range so that the incident X-ray does not touch on the upper surface of the thick protection film. When the 10 μm beam is incident to the protection film in the thickness of 2 mm in the transmitting direction and 30 μm in the laminating direction, measurement is possible for the upper limit of 1° in the incident angle for the sample surface. In the ordinary reflectivity measurement, sufficient angular range can be obtained. The upper thickness of film is ranged from 50 μm to 100 μm in the case of the X-ray beam formed through a slit and even when the light beam of this size is used, experiment can be realized as in the case of the present invention. Therefore, such film thickness is selected as the upper limit thickness.

According to an embodiment of the present invention, X-ray reflectivity from an internal stack can be measured with less influence of a protection film and a solution layer in a sample where the protection film or solution layer in the thickness of several μm or more are provided on the stack and thereby thickness of each layer of the internal stack can be inspected with higher accuracy.

DETAILED DESCRIPTION OF THE PREFERRED EMBODIMENTS

The preferred embodiments of the present invention will be explained hereunder in detail with reference to the accompanying drawings.

First Embodiment

Figure 3:
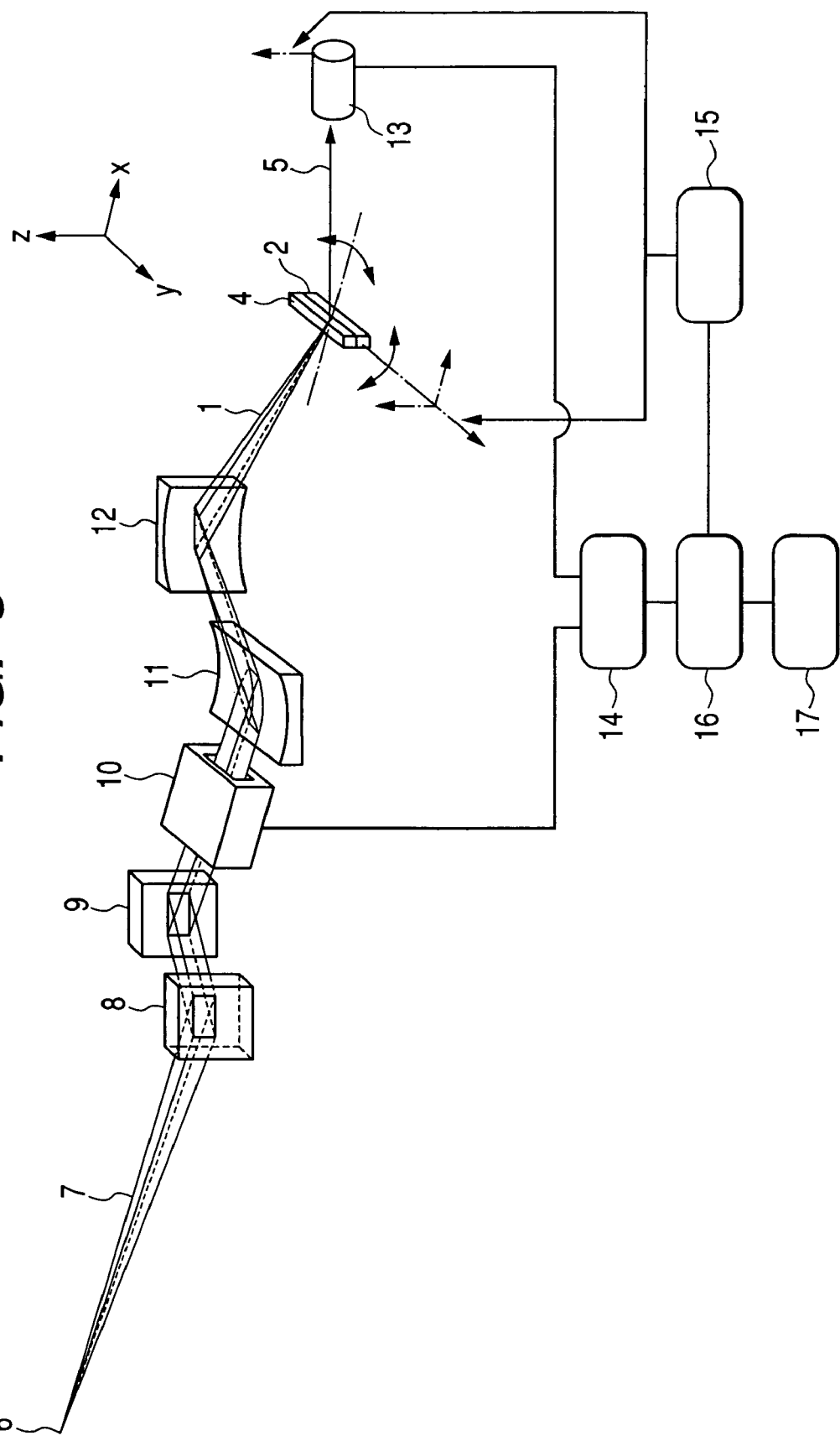
FIG. 3 is a block diagram of a preferred embodiment of the present invention.

FIG. 3 shows a preferred embodiment of the present invention. An X-ray 7 from an X-ray source 6 (undulator undulator light source) of a synchrotoron radiation facility (Spring-8) of the Japan Synchrotron Radiation Research Institute (JASRI) is converted to a monochromatic light with a first monochromatic crystal and a second monochromatic crystal 9. The monochromatic X-ray is formed with a slit (not shown) in the width of 100 μm in the z-direction and 100 μm in the y-direction and is incident to a vertical focusing mirror 11 passing through an ion chamber 10. Intensity of the incident X-ray is monitored with a current of the ion chamber 10. The incident X-ray 1 is focused to about 1 μm (Full Width Half Maximum: FWHM) at a sample position (position where a silicon substrate 2 and a $SiO_2$ film 4 are located in the figure). Intensity of the reflection X-ray 5 reflected by the sample is measured with an X-ray detector 13. Intensity of the incident X-ray of the reflection X-ray 5 can be obtained using a counter 14 from the signal intensity of ion chamber 10 and measurement signal of the X-ray detector 13. The light intensity obtained is inputted to a computer 16 for calculation of reflectivity and is then displayed on an output display 17.

The incident angle to the sample of the incident X-ray 1 and an exit angle of the reflection X-ray 5 are adjusted by controlling a driver/controller 15 of a high precision goniometer (not shown, only a drive axis is shown with an arrow mark). In this embodiment, reflectivity curves of FIG. 4 have been obtained by measuring reflectivity of the sample, while the incident angle is varied.

Figure 1:
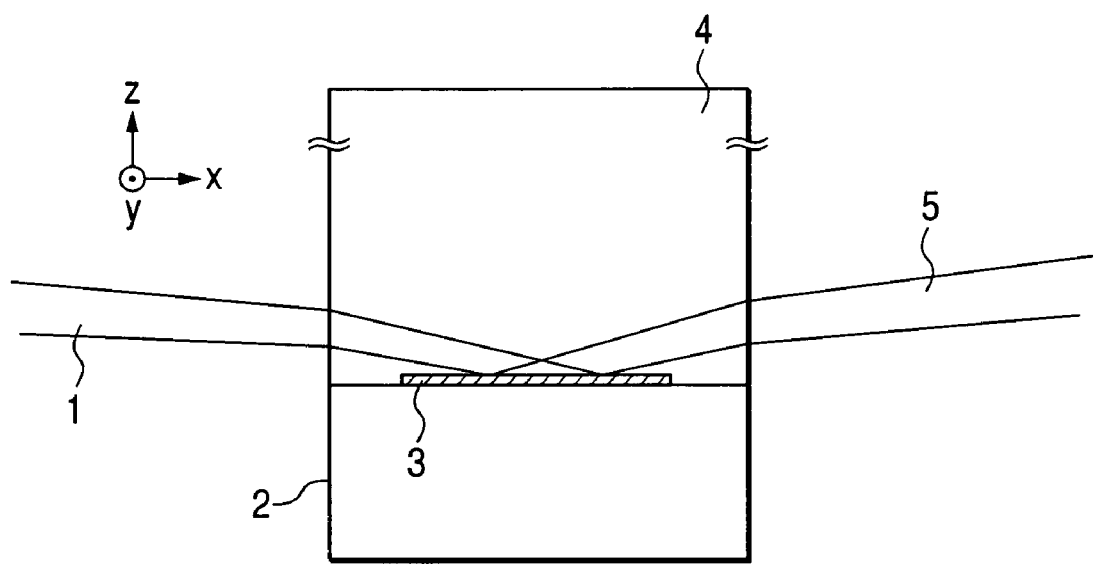
FIG. 1 is a schematic side view observed from y direction.
Figure 2:
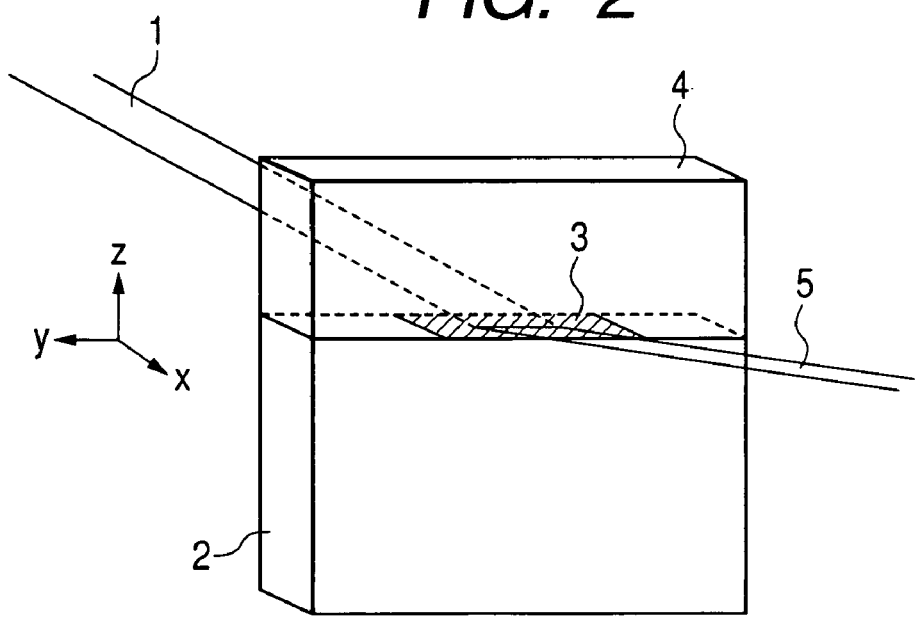
FIG. 2 is an enlarged view of an area near a sample of FIG. 3.

FIG. 2 shows an enlarged area near the sample in FIG. 3. The sample is formed by laminating an aluminum thin film 3 in the thickness of 30 nm on a silicon substrate 2 and then forming a $SiO_2$ film 4 thereon in the thickness of 5 μm. On the aluminum thin film 3, a pattern of in size of 500 μm×50 μm is defined. Under the condition where direction where pattern length of aluminum thin film 3 is 500 μm is defined as y axis, while the direction where the length is 50 μm as x axis, and the laminating direction as z axis, the y direction is cut in the length of 5 mm, while the x direction in the length of 400 μm. The incident X-ray 1 focused by an up-stream optical system passes through the $SiO_2$ film 4, reflected at the $SiO_2$/aluminum interface and aluminum/silicon substrate interface, and changes to the reflection X-ray 5 passing again through the $SiO_2$ film 4. FIG. 1 is a schematic side view when FIG. 2 is observed from the y-axis direction. The focused incident X-ray 1 enters the $SiO_2$ film and is then refracted thereby. In FIG. 2, this refraction is emphasized, but actual angular change is about 0.1 μrad that is sufficiently smaller in comparison with an aperture angle of the incident X-ray. Therefore, an incident angle can be approximately considered to be not changed. The X-ray applied to the aluminum thin film 3 after having passed the $SiO_2$ film is reflected at the $SiO_2$/aluminum interface and aluminum/silicon substrate interface. A couple of these reflection waves become the reflection X-ray 5 passing through the $SiO_2$ film and interface between a couple of reflected waves gives a certain influence on intensity of the reflection X-ray 5.

Figure 4:
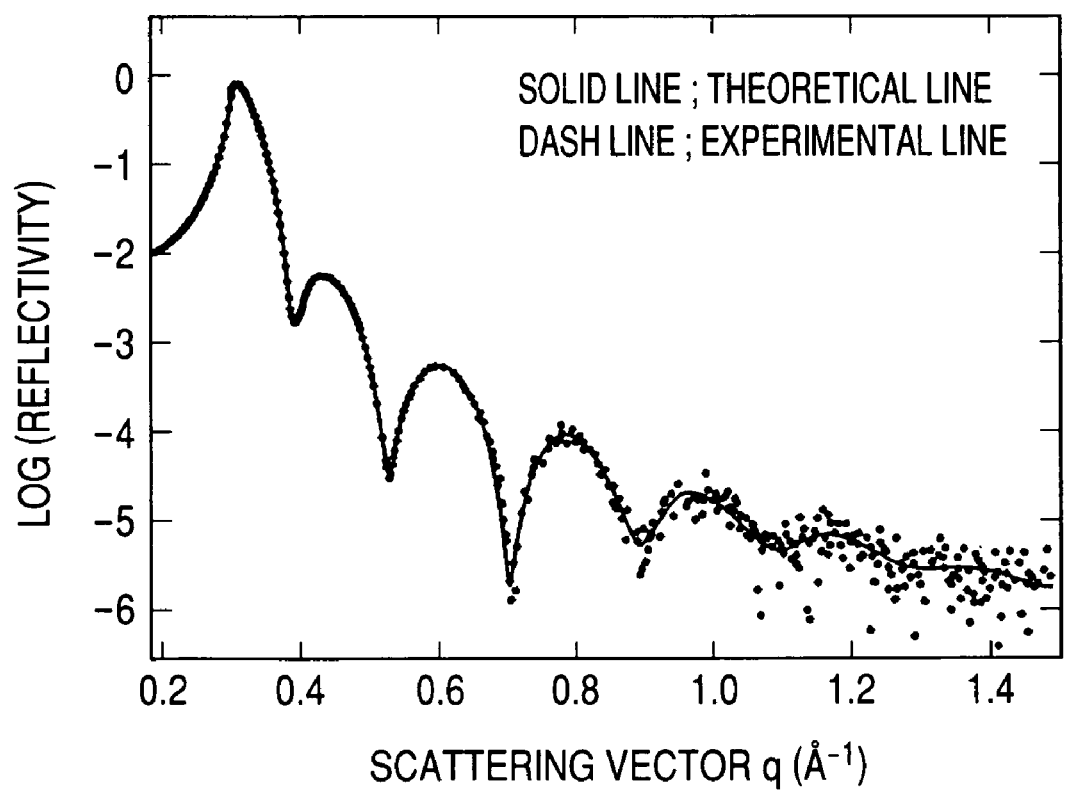
FIG. 4 is a graph showing example of measurements in the embodiment of the present invention.

Intensity of the reflection X-ray 5 also gives influence on absorption of light at the $SiO_2$ film 4 in addition to interference of the reflected waves. However, since distance in the $SiO_2$ film 4 through which the light passes almost does not change even when the incident angle is varied, compensation as a scale factor during analysis of the X-ray reflectivity is possible. A reflectivity profile obtained in this embodiment is shown in FIG. 4. The vertical axis (Log(reflectivity)) in FIG. 4 shows logarithmic expression of the X-ray reflectivity and the horizontal axis shows scattering vector ($q=(4\pi/\lambda)\cdot\sin\theta$). A dash line indicates experimental values and a solid line indicates results of calculation of a model. From the theoretical curve using the numerical formulae 1 to 4 and the minimum square analysis method of experimental values, it has been proved that thickness of aluminum thin film has been 29.8 nm.

The Fourier transformation method will also be explained as another analysis method. As the non-patent document 3 by Sakurai, et al. discloses, an incident angle is converted to scattering vector having compensated the refractive index ($=4\pi\cdot\{n_j^2-(\cos\theta)^2\}^{0.5}/\lambda$). In the case of the aluminum thin film, $n=1-8.46\times10^{-6}+i\ 1.57\times10^{-7}$ can be obtained, and an incident angle is converted using this value. Next, vibration structure is extracted by conducting curve-fitting for the range of q=0.3 to 1.4 (1/Å) with $y=a\cdot x^{-4}$ and then calculating a difference of the curve of curve-fitting from experimental reflectivity. The Fourier peak can be obtained by Fourier transformation of the vibration structure obtained. Thickness d of aluminum thin film has been analyzed by defining $d=\omega/4\pi$ from the frequency indicated by the Fourier peak position. Thickness of aluminum thin film obtained is 29.6 nm. From the results explained above, it has been proved that thickness of a thin film can be inspected by applying, to the reflectively curve in this embodiment, the minimum square analysis method and Fourier transformation analysis method that are generally used to analysis of X-ray reflectivity.

In the case of this sample, it has also been proved from if the calculation that if the incident angle exceeds 3°, the incident X-ray 1 is applied to the front surface of the $SiO_2$ film. The limit of this incident angle is determined by intensity of the incident X-ray, thickness of the protection film (thickness of the $SiO_2$ film 4, in this embodiment), and length of the cut-out sample in the x direction. However, based on the consideration of the results of FIG. 4, the incident angle required for measurement of X-ray reflectivity of six digits is about 1°. When the incident angle is equal to such value, it is enough, even when spreading of the incident X-ray is considered, that the protection film has the thickness almost equal to about three times the size of the focused light beam. Here, since the protection film formed on the thin film stack is generally in the thickness of several μm to several tens of μm, or in the maximum thickness of 100 μm, thickness of a thin film forming stack is about 15 times the size of the focused light beam even in the maximum thickness.

Moreover, it is better that thickness of the sample in the x direction is as thinner as possible because of absorption of the light at the protection film. However, it is recommended, considering easiness of process, that intensity of the transmitting X-ray is selected to a value larger than 30%. From the calculation of angular range in the actual measurement of X-ray reflectivity, it can be understood, when the protection film is formed of $SiO_2$, thickness is set to 2 mm or less with the X-ray energy of about 8 keV.

In the X-ray reflectivity method in the related art, it has been impossible to measure thickness of a sample film where a pattern is defined in such protection film. The reason is that an aperture angle of the incident X-ray must be set to 5μ rad or less for the measurement of an aluminum thin film embedded in the $SiO_2$ film of 5 μm, but it is impossible from the viewpoint of the principle to form a beam size of 30 μm or less in this parallelism. Even if ultra-parallel X-ray of 30 μm can be formed, when this X-ray is applied to the sample with the incident angle of 0.1°, the region irradiated with the X-ray spreads to 100 times on the front surface of sample in size of 3 mm, making it impossible to measure the reflectivity of the pattern in size of 50 μm×500 μm. Therefore, it is difficult to measure the X-ray reflectivity of a stacked within the protection film and to analyze the film thickness thereof without the embodiment of the present invention explained above.

Second Embodiment

Another embodiment of the present invention will be explained in FIG. 5. The X-ray 7 is formed in size of 100 μm in both z and y directions using the slit (not shown) using the X-ray source 6 as the undulator light source of the synchrotoron radiation facility (PF) of a High Energy Accelerator Research Organization, the X-ray 7 is incident to both vertical focusing mirror 11 and horizontal focusing mirror 12 passing through an ion chamber 10. The incident X-ray 1 reflected by the vertical focusing mirror 11 and the horizontal focusing mirror 12 is focused to about 10 μm (FWHM) at the sample position (position where a silicon substrate 2 and a Kapton film 19 are located). Intensity of the reflection X-ray 5 mirror-reflected from the sample can be obtained with the counter 15 by measuring the reflection X-ray 5 through energy analysis thereof with a solid-state semiconductor X-ray detector 18. The intensity obtained is sent to the computer 16 and the X-ray reflectivity calculated therein can be displayed on the display 17. The incident angle of the incident X-ray 1 to the sample and the exit angle of the reflection X-ray 5 are adjusted by controlling the driver/controller 15 of the high precision goniometer (not shown, only the drive axis is indicated with an arrow mark) with the computer 16. In this second embodiment, X-ray reflectivity is measured from energy and intensity of the reflection X-ray reflected from the sample by fixing the incident angle and applying a while X-ray to the sample.

Figure 5:
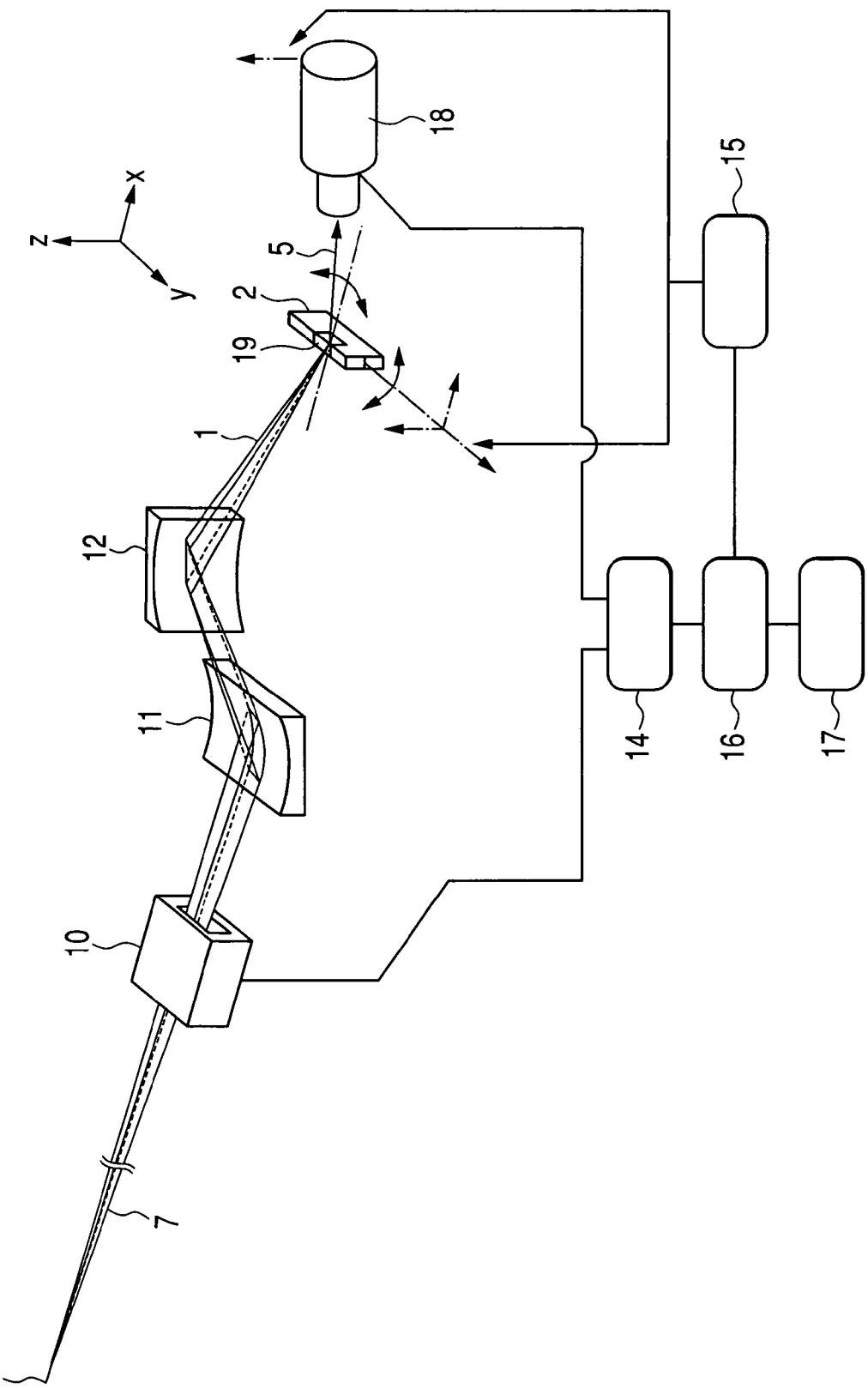
FIG. 5 is a block diagram of another embodiment of the present invention.
Figure 6:
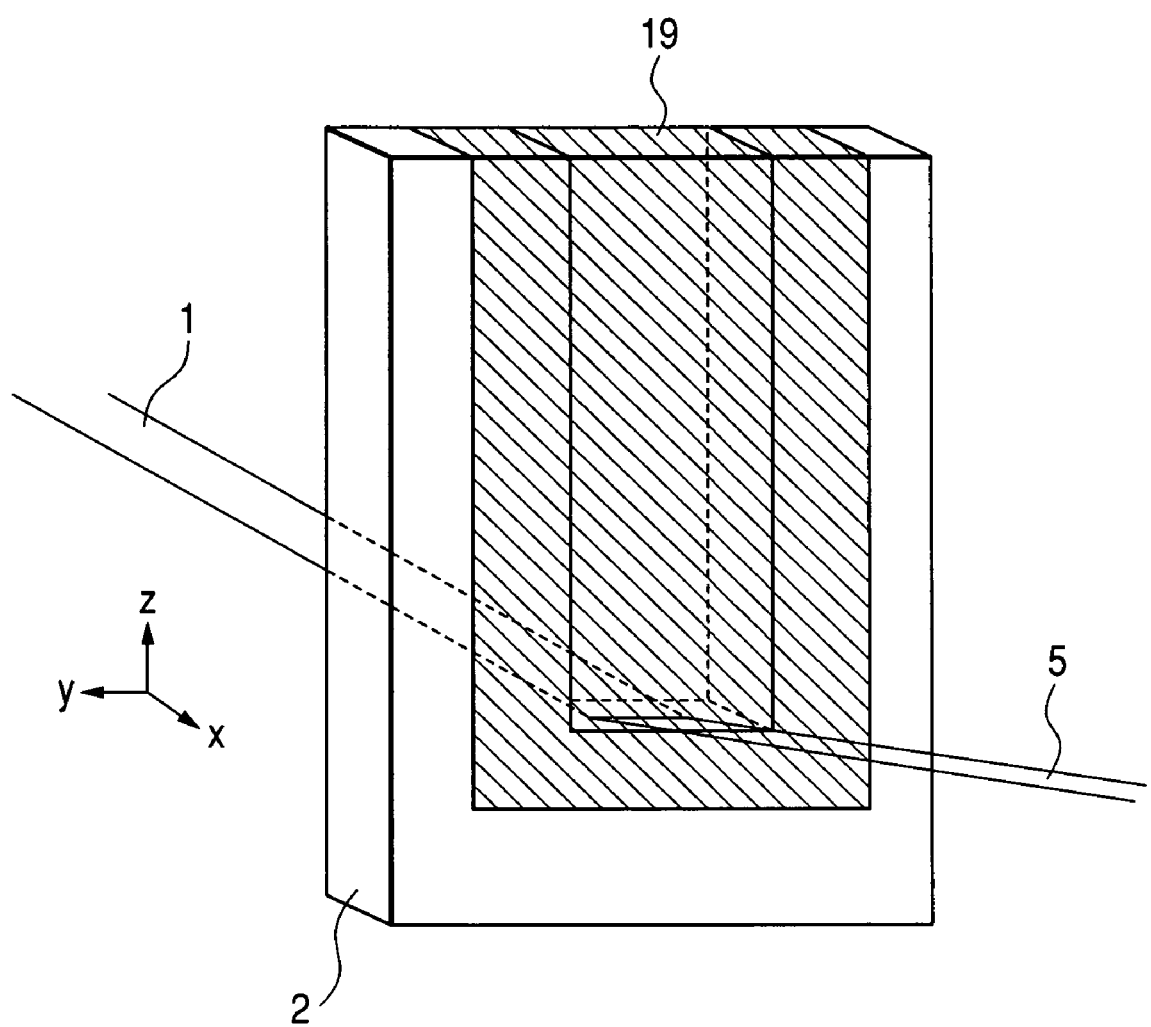
FIG. 6 is an enlarged view of an area near the sample of FIG. 5.
Figure 7:
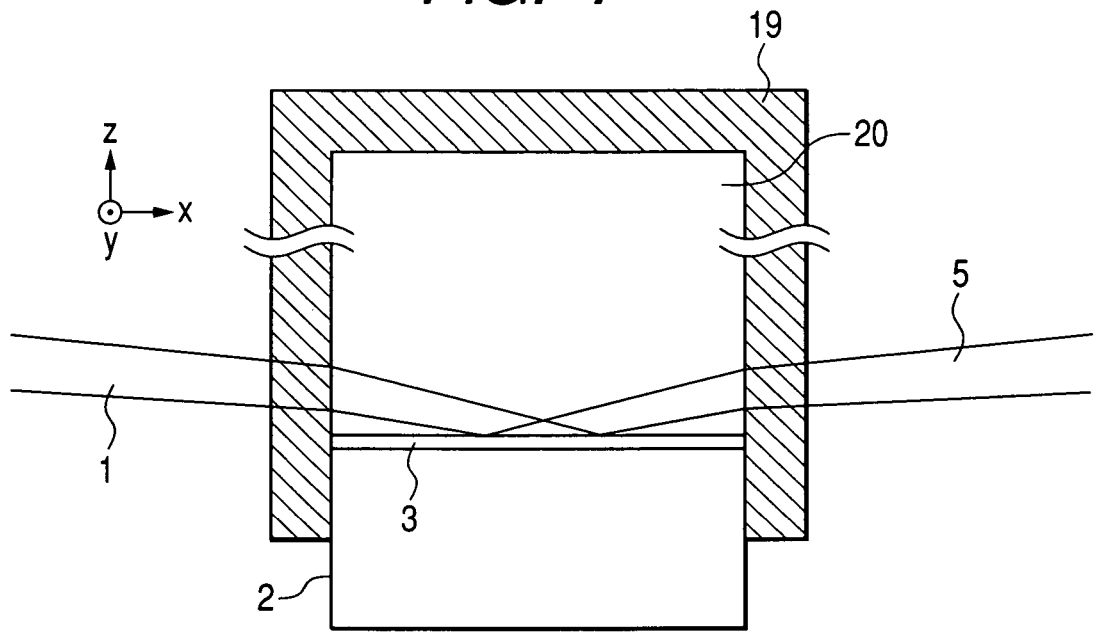
FIG. 7 is a schematic side view observed from y direction of FIG. 6.
Figure 8:
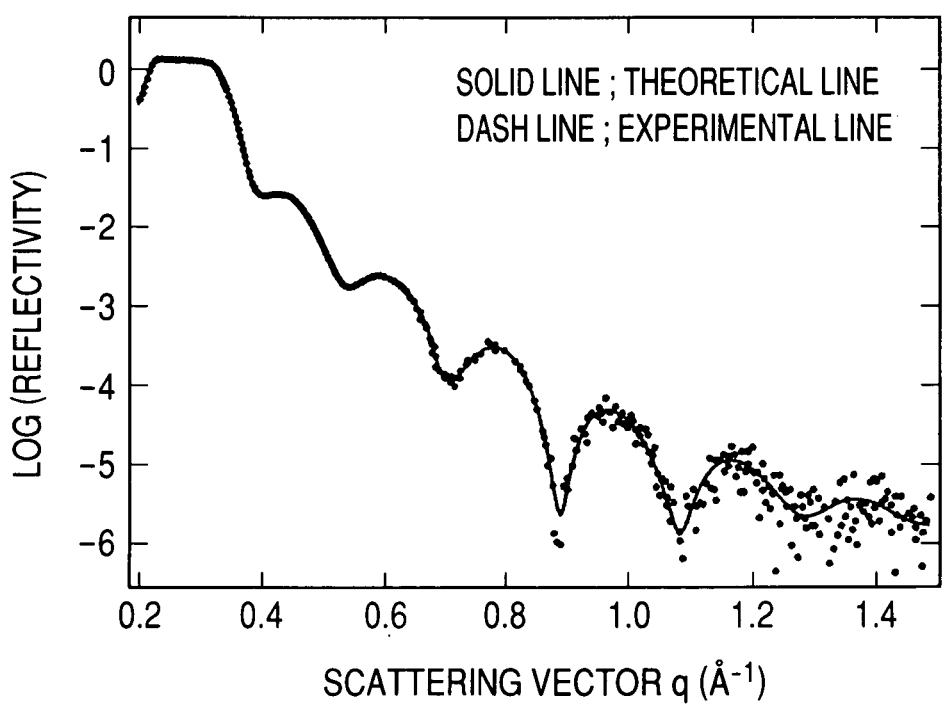
FIG. 8 is a graph showing example of measurements in another embodiment of the present invention.

FIG. 6 is an enlarged view of the area near the sample in FIG. 5. The sample is processed into the shape of letter U from the silicon substrate 2. The aluminum thin film 3 is evaporated at the internal side of a groove, and the Kapton film 19 is adhered in the thickness of 10 μm covering the U-shape groove. The groove is formed in the sizes of 2 mm in the y direction, 500 μm in the x direction, and 2 mm in the z direction. The solution 20 is supplied into the groove immediately before the measurement using a syringe from the upper side of the U-shape groove. The incident X-ray 1 focused with the upstream side optical system is transmitted passing through the Kapton film 19 and the solution 20, reflected at the solution/$AlO_x$ interface, $AlO_x$/aluminum interface, and aluminum/silicon substrate interface, and is transmitted again passing through the solution 20 and Kapton film 19 as the reflection X-ray 5. FIG. 7 is a sectional view of the groove in FIG. 6 observed from the y direction. The focused incident X-ray 1 is applied to the solution 20 passing through the Kapton film 19. The X-ray applied to the aluminum thin film 3 passing through the solution 20 is reflected at the $AlO_x$ film/solution interface formed by reaction with the solution, $AlO_x$/aluminum interface, and aluminum/silicon substrate. Intensity of the reflection X-ray is influenced by interference of the X-ray reflected at respective interfaces. Intensity of the reflection X-ray is influenced by the Kapton film 19, absorption of solution, and scattering. This influence can be compensated by measuring energy distribution of intensity by moving the incident X-ray to a position isolated from the bottom of U-shape groove. Moreover, since the solution surface is higher by about 2 mm than the sample position, reflection intensity at the solution/air interface cannot be measured. The reflection X-ray profile obtained in this second embodiment is shown in FIG. 8. In this figure, when scattering vector (q) is graduated on the horizontal axis, while energy of the reflection X-ray is assumed as E(keV), conversion is conducted under the condition of $q=(4\pi \cdot E/12.4)\sin\theta$. The dash line indicates experimental values and the solid line indicates theoretical values.

With the Fourier transformation method, the aluminum thin film has been proved to have the thickness of 30.5 nm. However, the $AlO_x$ layer cannot be analyzed successfully. A narrow energy range in measurement may be thought as a reason. Therefore, the minimum square analysis has been implemented for the theoretical curve and the experimental value using the formulae 1 to 4. As a result, it has been proved that thickness of the aluminum thin film is 30.5 nm and the $AlO_x$ film is formed in the thickness of 2.8 nm on the aluminum thin film. In this second embodiment, it has been proved that the film as thin as several nm cannot be analyzed for its thickness with the Fourier transformation analysis method but a layer having the film thickness of several tens of nm can be analyzed. Moreover, thickness of a thin film can be proved to be inspected with this second embodiment and the Fourier transformation analysis method. Moreover, thickness up to several nm can also be analyzed with the minimum square analysis of the theoretical curve and experiment values using the formulae 1 to 4 and it has also been proved that the X-ray reflectivity measured with this second embodiment can be analyzed as in the case of the ordinary measurement of X-ray reflectivity.

What is claimed is:

1. An inspection method for a thin film stack, comprising the steps of:
    placing a substrate, on which a stack formed by stacking a plurality of thin films is provided, on a sample board;
    applying an X-ray from a side surface of the stack in the direction crossing the thin film laminating direction;
    changing an incident angle (θ) of the X-ray to the side surface of the stack or wavelength of the incident X-ray to measure dependence on incident angle of reflectivity of the X-ray reflected from the stack or dependence on wavelength of the X-ray;
    wherein a shape of the X-ray beam incident to the stack is 10 μm or less in a short side or a short diameter at a position of the stack placed on the sample board;
    acquiring a curve indicating dependence on scattering vector of the X-ray reflectivity by converting the incident angle or the X-ray wavelength to a scattering vector; $q=(4\pi/\lambda)\sin\theta$; and
    obtaining film thickness of the stack with the minimum square analysis method of a measured reflectivity curve obtained from dependence on scattering vector of the X-ray reflectivity and a theoretical reflectivity curve derived theoretically.

2. The inspection method for a thin film stack according to claim 1, wherein thickness of thin films stacked into a stack is three times or more but is 15 times or less the short side or short diameter of the incident X-ray beam at the position of the stack placed on the sample board.

3. The inspection method for a thin film stack according to claim 1, wherein a solution layer having the thickness equal to three times or more but is equal to 15 times or less the short side or short diameter of the incident X-ray beam at the position of the stack placed on the sample board.

4. The inspection method for a thin film stack according to claim 1, wherein thickness of the stack in the transmitting direction of the X-ray is 100 times or more but is 2 mm or less the short side or short diameter of the X-ray incident to the stack.

5. An inspection method for a thin film stack, comprising the steps of:
    placing a substrate, on which a stack that is formed by stacking a plurality of thin films is provided, on a sample board;
    applying an X-ray to a side surface of the stack crossing the thin film stacking direction;
    wherein a shape of the X-ray beam incident to the stack is 10 μm or less in a short side or a short diameter at the position of the stack placed on the sample board;
    measuring dependence on incident angle of the X-ray or dependence on wavelength of the X-ray reflected from the stack by varying an incident angle (θ) of the X-ray to the side surface of the stack or wavelength of the X-ray;
    acquiring dependence on scattering vector of the X-ray reflectivity by converting the incident angle or wavelength of the X-ray to the scattering vector; $q=(4\pi/\lambda)\sin\theta$; and
    obtaining thickness of thin films of the stack from the Fourier peak obtained by Fourier transformation of the measured reflectivity curve obtained from dependence on scattering vector of the X-ray reflectivity.

6. The inspection method for thin a film stack according to claim 5, wherein thickness of a thin film stacked into the stack is three times or more but 15 times or less a short side or a short diameter of the incident X-ray beam at the position of the stacked placed on the sample board.

7. The inspection method for a thin film stack according to claim 5, wherein a solution layer, having thickness of three times or more but 15 times or less a short side or a short diameter of the incident X-ray beam at the position of the stack placed on the sample board, is provided on the stack.

8. The inspection method for a thin film stack according to claim 5, wherein thickness of the stack in the X-ray transmitting direction is 100 times or more but 2 mm or less a short side or a short diameter of the X-ray incident to the stack.

* * * * *